(12) United States Patent
Daniels et al.

(10) Patent No.: US 8,881,494 B2
(45) Date of Patent: Nov. 11, 2014

(54) FIRE RATED DOOR CORE

(71) Applicant: 820 Industrial Loop Partners LLC, Frisco, TX (US)

(72) Inventors: Evan R. Daniels, Frisco, TX (US); Jonathan Newton, Dallas, TX (US); Ralph Ross, Dallas, TX (US)

(73) Assignee: Polymer-Wood Technologies, Inc., Frisco, TX (US)

( * ) Notice: Subject to any disclaimer, the term of this patent is extended or adjusted under 35 U.S.C. 154(b) by 0 days.

(21) Appl. No.: 13/646,292

(22) Filed: Oct. 5, 2012

(65) Prior Publication Data

US 2013/0086858 A1    Apr. 11, 2013

Related U.S. Application Data

(60) Provisional application No. 61/545,771, filed on Oct. 11, 2011.

(51) Int. Cl.
| | |
|---|---|
| *E04C 2/54* | (2006.01) |
| *E04B 1/80* | (2006.01) |
| *E06B 5/16* | (2006.01) |
| *B23P 17/00* | (2006.01) |
| *E06B 3/72* | (2006.01) |
| *E04C 1/40* | (2006.01) |
| *E06B 3/82* | (2006.01) |
| *E06B 3/70* | (2006.01) |

(52) U.S. Cl.
CPC . *B23P 17/00* (2013.01); *E04B 1/80* (2013.01); *E06B 5/16* (2013.01); *E06B 2003/7046* (2013.01); *E06B 3/721* (2013.01); *E06B 2003/7051* (2013.01); *E04C 1/40* (2013.01); *E06B 3/82* (2013.01); *E06B 2003/7042* (2013.01)

USPC ......... 52/784.11; 52/458; 52/457; 52/309.15; 52/783.13; 52/784.14; 52/656.4

(58) Field of Classification Search
USPC .............. 52/456, 455, 784.1, 784.11, 309.15, 52/783.13, 783.12, 784.14, 232, 458, 457, 52/656.4; 428/373; 29/530
See application file for complete search history.

(56) References Cited

U.S. PATENT DOCUMENTS

| | | |
|---|---|---|
| 570,391 A | 10/1896 | Fox |
| 1,048,923 A | 12/1912 | Wheeler |

(Continued)

FOREIGN PATENT DOCUMENTS

| | | |
|---|---|---|
| EP | 2189612 A2 | 5/2010 |
| EP | 2230075 A1 | 9/2010 |

(Continued)

OTHER PUBLICATIONS

Search Report PCT/US07/04605, Oct. 4, 2007.

(Continued)

*Primary Examiner* — Chi Q Nguyen
(74) *Attorney, Agent, or Firm* — Daniel J. Chalker; Edwin S. Flores; Chalker Flores, LLP

(57) ABSTRACT

A core for a fire rated door includes an extruded fire resistant material, a filler material and a panel. The extruded fire resistant material has a first raised portion, a second raised portion and a lower portion that extends from a first end to a second end. The first raised portion has a first thickness and a first width that extends from the first side to the lower portion. The lower portion has a second thickness. The second raised portion has the first thickness and a second width that extends from the second side to the lower portion. The filler material is disposed above the lower portion of the extruded fire resistant material between the first raised portion and the second portion. The panel is attached to the first raised portion and the second raised portion of the extruded fire resistant material and covers the filler material.

14 Claims, 4 Drawing Sheets

(56) References Cited

U.S. PATENT DOCUMENTS

| | | |
|---|---|---|
| 3,517,468 A | 6/1970 | Woods |
| 3,908,062 A | 9/1975 | Roberts |
| 3,987,600 A | 10/1976 | Baehr |
| 3,994,110 A | 11/1976 | Ropella |
| 4,014,149 A | 3/1977 | Yamamoto |
| 4,045,937 A | 9/1977 | Stucky |
| 4,075,804 A | 2/1978 | Zimmerman |
| 4,084,571 A | 4/1978 | McFarland |
| 4,159,302 A | 6/1979 | Greve et al. |
| 4,225,247 A | 9/1980 | Hodson |
| 4,225,357 A | 9/1980 | Hodson |
| 4,284,119 A | 8/1981 | Martin et al. |
| 4,302,127 A | 11/1981 | Hodson |
| 4,339,487 A | 7/1982 | Mullet |
| 4,343,127 A | 8/1982 | Greve et al. |
| 4,347,653 A | 9/1982 | Martin et al. |
| 4,398,842 A | 8/1983 | Hodson |
| 4,428,775 A | 1/1984 | Johnson et al. |
| 4,434,899 A | 3/1984 | Rivkin |
| 4,443,992 A | 4/1984 | Shechter |
| 4,489,121 A | 12/1984 | Luckanuck |
| 4,552,463 A | 11/1985 | Hodson |
| 4,660,338 A | 4/1987 | Wagner |
| 4,695,494 A | 9/1987 | Fowler et al. |
| 4,704,834 A | 11/1987 | Turner |
| 4,716,700 A | 1/1988 | Hagemeyer |
| 4,716,702 A | 1/1988 | Dickson |
| 4,800,538 A | 1/1989 | Passmore et al. |
| 4,811,538 A | 3/1989 | Lehnert et al. |
| 4,864,789 A | 9/1989 | Thorn |
| 4,889,428 A | 12/1989 | Hodson |
| 4,896,471 A | 1/1990 | Turner |
| 4,922,674 A | 5/1990 | Thorn |
| 4,944,595 A | 7/1990 | Hodson |
| 4,946,504 A | 8/1990 | Hodson |
| 4,998,598 A | 3/1991 | Mardian et al. |
| 5,061,319 A | 10/1991 | Hodson |
| 5,074,087 A | 12/1991 | Green |
| 5,100,586 A | 3/1992 | Jennings et al. |
| 5,108,677 A | 4/1992 | Ayres |
| 5,154,358 A | 10/1992 | Hartle |
| 5,169,566 A | 12/1992 | Stucky et al. |
| 5,232,496 A | 8/1993 | Jennings et al. |
| 5,239,799 A | 8/1993 | Bies et al. |
| 5,242,078 A | 9/1993 | Haas et al. |
| 5,305,577 A | 4/1994 | Richards et al. |
| 5,311,381 A | 5/1994 | Lee |
| 5,317,119 A | 5/1994 | Ayres |
| 5,339,522 A | 8/1994 | Paquin et al. |
| 5,344,490 A | 9/1994 | Roosen et al. |
| 5,356,579 A | 10/1994 | Jennings et al. |
| 5,358,676 A | 10/1994 | Jennings et al. |
| 5,376,320 A | 12/1994 | Tiefenbacher et al. |
| 5,385,764 A | 1/1995 | Andersen et al. |
| 5,417,024 A | 5/1995 | San Paolo |
| 5,433,189 A | 7/1995 | Bales et al. |
| 5,440,843 A | 8/1995 | Langenhorst |
| 5,453,310 A | 9/1995 | Andersen et al. |
| 5,505,987 A | 4/1996 | Jennings et al. |
| 5,506,046 A | 4/1996 | Andersen et al. |
| 5,508,072 A | 4/1996 | Andersen et al. |
| 5,514,430 A | 5/1996 | Andersen et al. |
| 5,522,195 A | 6/1996 | Bargen |
| 5,527,387 A | 6/1996 | Andersen et al. |
| 5,540,026 A * | 7/1996 | Gartland ............ 52/455 |
| 5,543,186 A | 8/1996 | Andersen et al. |
| 5,545,297 A | 8/1996 | Andersen et al. |
| 5,545,450 A | 8/1996 | Andersen et al. |
| 5,549,859 A | 8/1996 | Andersen et al. |
| 5,557,899 A | 9/1996 | Dube et al. |
| 5,569,514 A | 10/1996 | Ayres |
| 5,580,409 A | 12/1996 | Andersen et al. |
| 5,580,624 A | 12/1996 | Andersen et al. |
| 5,582,670 A | 12/1996 | Andersen et al. |
| 5,614,307 A | 3/1997 | Andersen et al. |
| 5,618,341 A | 4/1997 | Andersen et al. |
| 5,626,954 A | 5/1997 | Andersen et al. |
| 5,631,052 A | 5/1997 | Andersen et al. |
| 5,631,053 A | 5/1997 | Andersen et al. |
| 5,631,097 A | 5/1997 | Andersen et al. |
| 5,635,292 A | 6/1997 | Jennings et al. |
| 5,637,412 A | 6/1997 | Jennings et al. |
| 5,641,584 A | 6/1997 | Andersen et al. |
| 5,644,870 A | 7/1997 | Chen |
| 5,653,075 A | 8/1997 | Williamson |
| 5,654,048 A | 8/1997 | Andersen et al. |
| 5,658,603 A | 8/1997 | Andersen et al. |
| 5,658,624 A | 8/1997 | Anderson et al. |
| 5,660,900 A | 8/1997 | Andersen et al. |
| 5,660,903 A | 8/1997 | Andersen et al. |
| 5,660,904 A | 8/1997 | Andersen et al. |
| 5,662,731 A | 9/1997 | Andersen et al. |
| 5,665,439 A | 9/1997 | Andersen et al. |
| 5,665,442 A | 9/1997 | Andersen et al. |
| 5,676,905 A | 10/1997 | Andersen et al. |
| 5,679,145 A | 10/1997 | Andersen et al. |
| 5,679,381 A | 10/1997 | Andersen et al. |
| 5,683,772 A | 11/1997 | Andersen et al. |
| 5,691,014 A | 11/1997 | Andersen et al. |
| 5,695,811 A | 12/1997 | Andersen et al. |
| 5,702,787 A | 12/1997 | Andersen et al. |
| 5,705,203 A | 1/1998 | Andersen et al. |
| 5,705,237 A | 1/1998 | Andersen et al. |
| 5,705,238 A | 1/1998 | Andersen et al. |
| 5,705,239 A | 1/1998 | Andersen et al. |
| 5,705,242 A | 1/1998 | Andersen et al. |
| 5,707,474 A | 1/1998 | Andersen et al. |
| 5,709,827 A | 1/1998 | Andersen et al. |
| 5,709,913 A | 1/1998 | Andersen et al. |
| 5,711,908 A | 1/1998 | Anderson et al. |
| 5,714,217 A | 2/1998 | Andersen et al. |
| 5,716,675 A | 2/1998 | Andersen et al. |
| 5,720,142 A | 2/1998 | Morrison |
| 5,720,913 A | 2/1998 | Andersen et al. |
| 5,736,209 A | 4/1998 | Andersen et al. |
| 5,738,921 A | 4/1998 | Andersen et al. |
| 5,740,635 A | 4/1998 | Gil et al. |
| 5,749,178 A | 5/1998 | Garmong |
| 5,753,308 A | 5/1998 | Andersen et al. |
| 5,766,525 A | 6/1998 | Andersen et al. |
| 5,776,388 A | 7/1998 | Andersen et al. |
| 5,782,055 A | 7/1998 | Crittenden |
| 5,783,126 A | 7/1998 | Andersen et al. |
| 5,786,080 A | 7/1998 | Andersen et al. |
| 5,798,010 A | 8/1998 | Richards et al. |
| 5,798,151 A | 8/1998 | Andersen et al. |
| 5,800,647 A | 9/1998 | Andersen et al. |
| 5,800,756 A | 9/1998 | Andersen et al. |
| 5,810,961 A | 9/1998 | Andersen et al. |
| 5,830,305 A | 11/1998 | Andersen et al. |
| 5,830,548 A | 11/1998 | Andersen et al. |
| 5,843,544 A | 12/1998 | Andersen et al. |
| 5,849,155 A | 12/1998 | Gasland |
| 5,851,634 A | 12/1998 | Andersen et al. |
| 5,868,824 A | 2/1999 | Andersen et al. |
| 5,879,722 A | 3/1999 | Andersen et al. |
| 5,887,402 A | 3/1999 | Ruggie et al. |
| 5,916,077 A | 6/1999 | Tang |
| 5,928,741 A | 7/1999 | Andersen et al. |
| 5,976,235 A | 11/1999 | Andersen et al. |
| 6,030,673 A | 2/2000 | Andersen et al. |
| 6,067,699 A | 5/2000 | Jackson |
| 6,083,586 A | 7/2000 | Andersen et al. |
| 6,090,195 A | 7/2000 | Andersen et al. |
| 6,115,976 A | 9/2000 | Gomez |
| 6,119,411 A | 9/2000 | Mateu Gil et al. |
| 6,161,363 A | 12/2000 | Herbst |
| 6,168,857 B1 | 1/2001 | Andersen et al. |
| 6,180,037 B1 | 1/2001 | Andersen et al. |
| 6,200,404 B1 | 3/2001 | Andersen et al. |
| 6,231,970 B1 | 5/2001 | Andersen et al. |
| 6,268,022 B1 | 7/2001 | Schlegel et al. |
| 6,299,970 B1 | 10/2001 | Richards et al. |
| 6,311,454 B1 | 11/2001 | Kempel |

(56) References Cited

U.S. PATENT DOCUMENTS

| | | |
|---|---|---|
| 6,327,821 B1 | 12/2001 | Chang |
| 6,347,934 B1 | 2/2002 | Andersen et al. |
| 6,379,446 B1 | 4/2002 | Andersen et al. |
| 6,434,899 B1 | 8/2002 | Fortin et al. |
| 6,494,704 B1 | 12/2002 | Andersen et al. |
| 6,503,751 B2 | 1/2003 | Hugh |
| 6,528,151 B1 | 3/2003 | Shah et al. |
| 6,572,355 B1 | 6/2003 | Bauman et al. |
| 6,573,340 B1 | 6/2003 | Khemani et al. |
| 6,581,588 B2 | 6/2003 | Wiedemann et al. |
| 6,619,005 B1 | 9/2003 | Chen |
| 6,643,991 B1 | 11/2003 | Moyes |
| 6,665,997 B2 | 12/2003 | Chen |
| 6,668,499 B2 | 12/2003 | Degelsegger |
| 6,684,590 B2 | 2/2004 | Frumkin |
| 6,688,063 B1 | 2/2004 | Lee et al. |
| 6,696,979 B2 | 2/2004 | Manten et al. |
| 6,743,830 B2 | 6/2004 | Soane et al. |
| 6,745,526 B1 | 6/2004 | Autovino |
| 6,764,625 B2 | 7/2004 | Walsh |
| 6,766,621 B2 | 7/2004 | Reppermund |
| 6,779,859 B2 | 8/2004 | Koons |
| 6,843,543 B2 | 1/2005 | Ramesh |
| 6,866,081 B1 | 3/2005 | Nordgard et al. |
| 6,886,306 B2 | 5/2005 | Churchill et al. |
| 6,890,604 B2 | 5/2005 | Daniels |
| 6,961,998 B2 | 11/2005 | Furchheim et al. |
| 6,964,722 B2 | 11/2005 | Taylor et al. |
| 6,981,351 B2 | 1/2006 | Degelsegger |
| 7,059,092 B2 | 6/2006 | Harkin et al. |
| 7,090,897 B2 | 8/2006 | Hardesty |
| RE39,339 E | 10/2006 | Andersen et al. |
| 7,185,468 B2 | 3/2007 | Clark et al. |
| 7,241,832 B2 | 7/2007 | Khemani et al. |
| 7,279,437 B2 | 10/2007 | Kai et al. |
| 7,297,394 B2 | 11/2007 | Khemani et al. |
| 7,386,368 B2 | 6/2008 | Andersen et al. |
| 7,598,460 B2 | 10/2009 | Roberts, IV et al. |
| 7,617,606 B2 | 11/2009 | Robbins et al. |
| 7,669,383 B2 | 3/2010 | Darnell |
| 7,721,500 B2 | 5/2010 | Clark et al. |
| 7,775,013 B2 | 8/2010 | Bartlett et al. |
| 7,803,723 B2 | 9/2010 | Herbert et al. |
| 7,832,166 B2 | 11/2010 | Daniels |
| 7,886,501 B2 | 2/2011 | Bartlett et al. |
| 7,897,235 B1 | 3/2011 | Locher et al. |
| 8,037,820 B2 | 10/2011 | Daniels |
| 8,097,544 B2 | 1/2012 | Majors |
| 8,209,866 B2 | 7/2012 | Daniels |
| 8,381,381 B2 | 2/2013 | Daniels |
| 8,650,834 B2 | 2/2014 | Hardwick et al. |
| 2002/0053757 A1 | 5/2002 | Andersen et al. |
| 2002/0078659 A1 | 6/2002 | Hunt |
| 2002/0100996 A1 | 8/2002 | Moyes et al. |
| 2002/0124497 A1 | 9/2002 | Fortin et al. |
| 2002/0128352 A1 | 9/2002 | Baehr |
| 2003/0015124 A1 | 1/2003 | Klus |
| 2003/0033786 A1 | 2/2003 | Yulkowski |
| 2003/0084980 A1 | 5/2003 | Seufert et al. |
| 2003/0115817 A1 | 6/2003 | Blackwell et al. |
| 2003/0205187 A1 | 11/2003 | Carlson et al. |
| 2003/0209403 A1 | 11/2003 | Daniels |
| 2003/0211251 A1 | 11/2003 | Daniels |
| 2003/0211252 A1 | 11/2003 | Daniels |
| 2004/0231285 A1 | 11/2004 | Hunt et al. |
| 2005/0092237 A1 | 5/2005 | Daniels |
| 2005/0241541 A1 | 11/2005 | Hohn et al. |
| 2005/0284030 A1 | 12/2005 | Autovino et al. |
| 2006/0070321 A1 | 4/2006 | Au |
| 2006/0096240 A1 | 5/2006 | Fortin |
| 2006/0287773 A1 | 12/2006 | Andersen et al. |
| 2007/0021515 A1 | 1/2007 | Glenn et al. |
| 2007/0092712 A1 | 4/2007 | Hodson |
| 2007/0095570 A1 | 5/2007 | Roberts, IV et al. |
| 2007/0125043 A1 | 6/2007 | Clark et al. |
| 2007/0125044 A1 | 6/2007 | Clark et al. |
| 2007/0157537 A1 | 7/2007 | Nicolson et al. |
| 2007/0175139 A1 | 8/2007 | Nicolson et al. |
| 2007/0193220 A1 | 8/2007 | Daniels |
| 2008/0016820 A1 | 1/2008 | Robbins, Sr. et al. |
| 2008/0027583 A1 | 1/2008 | Andersen et al. |
| 2008/0027584 A1 | 1/2008 | Andersen et al. |
| 2008/0027685 A1 | 1/2008 | Andersen et al. |
| 2008/0041014 A1* | 2/2008 | Lynch et al. ............. 52/745.19 |
| 2008/0066653 A1 | 3/2008 | Andersen et al. |
| 2008/0086982 A1 | 4/2008 | Parenteau et al. |
| 2008/0099122 A1 | 5/2008 | Andersen et al. |
| 2008/0145580 A1 | 6/2008 | McAllister et al. |
| 2008/0286519 A1 | 11/2008 | Nicolson et al. |
| 2009/0151602 A1 | 6/2009 | Francis |
| 2010/0095622 A1 | 4/2010 | Niemoller |
| 2010/0136269 A1 | 6/2010 | Andersen et al. |
| 2011/0040401 A1 | 2/2011 | Daniels |
| 2011/0120349 A1 | 5/2011 | Andersen et al. |
| 2011/0131921 A1 | 6/2011 | Chen |
| 2011/0167753 A1 | 7/2011 | Sawyers et al. |
| 2012/0208003 A1 | 8/2012 | Beard |
| 2013/0008115 A1 | 1/2013 | Bierman |
| 2013/0086858 A1 | 4/2013 | Daniels et al. |
| 2014/0000193 A1 | 1/2014 | Daniels et al. |
| 2014/0000195 A1 | 1/2014 | Daniels et al. |
| 2014/0000196 A1 | 1/2014 | Daniels et al. |

FOREIGN PATENT DOCUMENTS

| | | |
|---|---|---|
| JP | H05-052075 A | 3/1993 |
| JP | 2004332401 A | 11/2004 |
| WO | 02-31306 A1 | 4/2002 |
| WO | PCT/US02/31306 A1 | 4/2002 |
| WO | PCT/US06/23863 | 12/2006 |
| WO | PCT/US06/60161 | 5/2007 |
| WO | PCT/US06/60455 | 5/2007 |
| WO | WO 2007053852 A2 | 5/2007 |
| WO | PCT/US08/62151 | 11/2008 |

OTHER PUBLICATIONS

International Search Report (KIPO) PCT/US2013/048712 dated Sep. 10, 2013.
International Search Report (KIPO) PCT/US2013/048642 dated Sep. 2, 2013.
Search Report PCT US12/059053 Mar. 12, 2013.

* cited by examiner

FIRE RATED DOOR CORE

CROSS-REFERENCE TO RELATED APPLICATIONS

This application claims priority to U.S. Provisional Application Ser. No. 61/545,771, filed Oct. 11, 2011, the entire contents of which are incorporated herein by reference.

FIELD OF THE INVENTION

The present invention relates generally to the field of door manufacturing and, more particularly, to a fire rated door core.

BACKGROUND OF THE INVENTION

Many methods and techniques for manufacturing fire rated doors have been developed over time. But most of these prior art designs do not lend themselves well to fully automated manufacturing processes. Moreover, the prior art fire rated doors are expensive and require the internal mineral core. The internal core can be exposed in routed details and may reduce the strength of the door as a result of the reduced thickness of the door panels. In addition, alignment of the panels during assembly can be troublesome and require additional finishing to square the door after assembly. As a result, there is a need for a fire rated door that does not suffer from these deficiencies.

SUMMARY OF THE INVENTION

The door core of the present invention provides the fire resistant capabilities necessary to receive the necessary fire certifications. In most cases, the length and width of the fire rated door core will match the length and width specifications of the final door product. The dimensions of the fire rated door core will typically be in widths of three feet and four feet and having a length ranging from seven feet to ten feet. The thickness of the fire core can be up to 1.50 inches. In some cases, an exterior banding may be added to the sides and ends of the fire rated door core. In other cases, an intumescent banding may be added between the exterior banding and fire rated door core.

More specifically, the present invention provides a core for a fire rated door that includes an extruded fire resistant material, a filler material and a panel. The extruded fire resistant material has a bottom, a first side, a second side, a first end and a second end to form a first raised portion, a second raised portion and a lower portion disposed between the first raised portion and the second raised portion. The first raised portion, the second raised portion and the lower portion extend from the first end to the second end. The first raised portion has a first thickness above the bottom and a first width that extends from the first side to the lower portion. The lower portion has a second thickness above the bottom. The second raised portion has the first thickness above the bottom and a second width that extends from the second side to the lower portion. The first width of the first raised portion is sufficient to accommodate a lockset. The second width of the second raised portion is sufficient to accommodate a set of door hinges. The filler material has a third thickness disposed above the lower portion of the extruded fire resistant material between the first raised portion and the second portion such that the sum of the second thickness and the third thickness is substantially equal to the first thickness. The panel is attached to the first raised portion and the second raised portion of the extruded fire resistant material and covers the filler material.

In addition, the present invention provides a fire rated door having a core, a first decorative panel and a second decorative panel. The core includes: (1) an extruded fire resistant material having a bottom, a first side, a second side, a first end and a second end to form a first raised portion, a second raised portion and a lower portion disposed between the first raised portion and the second raised portion, wherein: (a) the first raised portion, the second raised portion and the lower portion extend from the first end to the second end, (b) the first raised portion has a first thickness above the bottom and a first width that extends from the first side to the lower portion, (c) the lower portion has a second thickness above the bottom, (d) the second raised portion has the first thickness above the bottom and a second width that extends from the second side to the lower portion, (e) the first width of the first raised portion is sufficient to accommodate a lockset, and (f) the second width of the second raised portion is sufficient to accommodate a set of door hinges, (2) a filler material having a third thickness disposed above the lower portion of the extruded fire resistant material between the first raised portion and the second portion such that the sum of the second thickness and the third thickness is substantially equal to the first thickness, and (3) a panel attached to the first raised portion and the second raised portion of the extruded fire resistant material and covering the filler material. The first decorative panel is attached to the panel of the core. The second decorative panel attached to the bottom of the extruded fire resistant material.

Moreover, the present invention provides a method of manufacturing a core for a fire rated door by providing an extruded fire resistant material, attaching a panel to the first raised portion and the second raised portion of the extruded fire resistant material such that a gap between the panel and the lower portion of the extruded fire resistant material has a third thickness and the sum of the second thickness and the third thickness is substantially equal to the first thickness, and filling the gap with a filler material. The extruded fire resistant material has a bottom, a first side, a second side, a first end and a second end to form a first raised portion, a second raised portion and a lower portion disposed between the first raised portion and the second raised portion, wherein: (a) the first raised portion, the second raised portion and the lower portion extend from the first end to the second end, (b) the first raised portion has a first thickness above the bottom and a first width that extends from the first side to the lower portion, (c) the lower portion has a second thickness above the bottom, (d) the second raised portion has the first thickness above the bottom and a second width that extends from the second side to the lower portion, (e) the first width of the first raised portion is sufficient to accommodate a lockset, and (f) the second width of the second raised portion is sufficient to accommodate a set of door hinges.

Furthermore, the present invention provides a method of manufacturing a core for a fire rated door by providing an extruded fire resistant material, filling the lower portion of the extruded fire resistant material between the first raised portion and the second portion with a filler material to a third thickness such that the sum of the second thickness and the third thickness is substantially equal to the first thickness, and attaching a panel to the first raised portion and the second raised portion of the extruded fire resistant material and covering the filler material. The extruded fire resistant material has a bottom, a first side, a second side, a first end and a second end to form a first raised portion, a second raised portion and a lower portion disposed between the first raised portion and the second raised portion, wherein: (a) the first raised portion, the second raised portion and the lower portion extend from the first end to the second end, (b) the first raised portion has a first thickness above the bottom and a first width that extends from the first side to the lower portion, (c) the lower portion has a second thickness above the bottom, (d) the second raised portion has the first thickness above the bottom and a second width that extends from the second side to the lower portion, (e) the first width of the first raised portion is sufficient to accommodate a lockset, and (f) the second width of the second raised portion is sufficient to accommodate a set of door hinges;

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to fire rated doors, but it will be understood that the concepts of the present invention are applicable to any type of door.

The door core of the present invention provides the fire resistant capabilities necessary to receive the necessary fire certifications. In most cases, the length and width of the fire rated door core will match the length and width specifications of the final door product. The dimensions of the fire rated door core will typically be in widths of three feet and four feet and having a length ranging from seven feet to ten feet. The thickness of the fire core can be up to 1.50 inches. In some cases, an exterior banding may be added to the sides and ends of the fire rated door core. In other cases, an intumescent banding may be added between the exterior banding and fire rated door core.

Figure 1A:
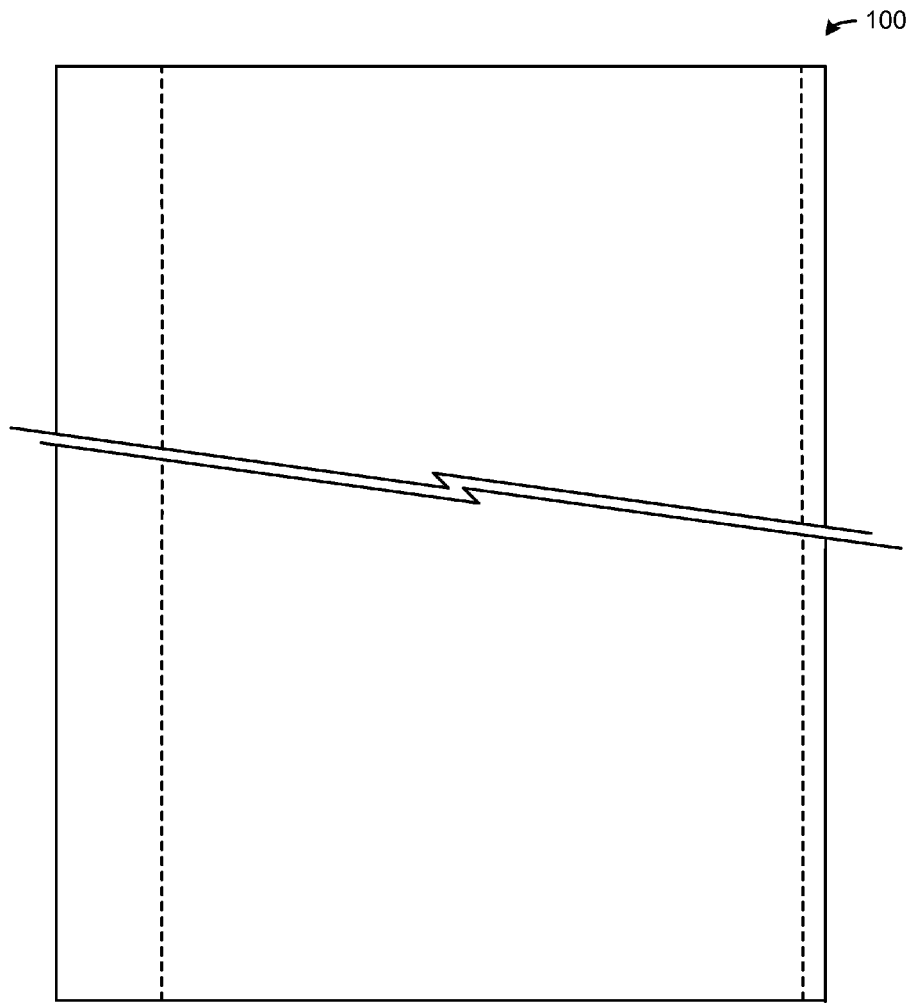
FIGS. 1A and 1B are front and cross-sectional views, respectively, of a core for a fire rated door in accordance with one embodiment of the present invention.
Figure 1B:
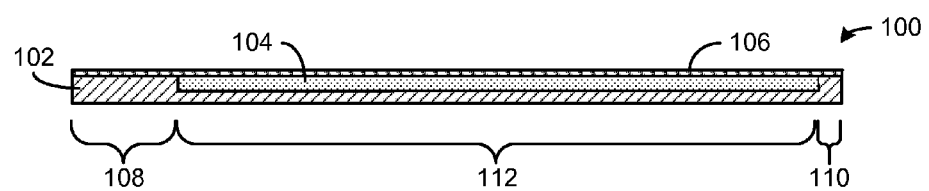

Now referring to FIGS. 1A and 1B, front and cross-sectional views, respectively, of a core 100 for a fire rated door in accordance with one embodiment of the present invention are shown. The core 100 is made of three different materials: an extruded fire resistant material 102, a filler material 104, and a panel 106. The extruded fire resistant material 102 forms the bottom and the sides of the core 100. The thickness of the bottom of the extruded fire resistant material 102 will vary depending on the fire rating required for that specific core 100. One side of the extruded fire resistant material 102 of the core 100 will have first raised portion 108 having a first width (e.g., five inches) sufficient to accommodate a lockset (door handle, lock, etc.) for the final door (i.e., to provide support for the final door's locking mechanism). The other side of the extruded fire resistant material 102 will have a second raised portion 110 having a second width (e.g., one inch) sufficient to accommodate a set of door hinges for the final door (e.g., to provide screw-pulling strength to the core). Depending on the thickness of the lower portion 112 of the extruded fire resistant material 102, there will be a gap in the middle of the core 100. This gap is to be filled with the filler material 104 (e.g., Styrene, spray foam, protective panels, etc). The core 100 is then topped with the panel 106 (e.g., composite flat surface) such that the completed core 100 does not have a thickness greater than approximately 1.50 inches.

The completed core 100 can then be utilized by a door manufacturer as the fire resistant core of the manufacturer's fire-rated door. The manufacturer will typically finish the final door by adding a final piece of wood or veneer to the core 100 (front, back or both front and back) to provide the aesthetic appeal of the door.

Figure 2A:
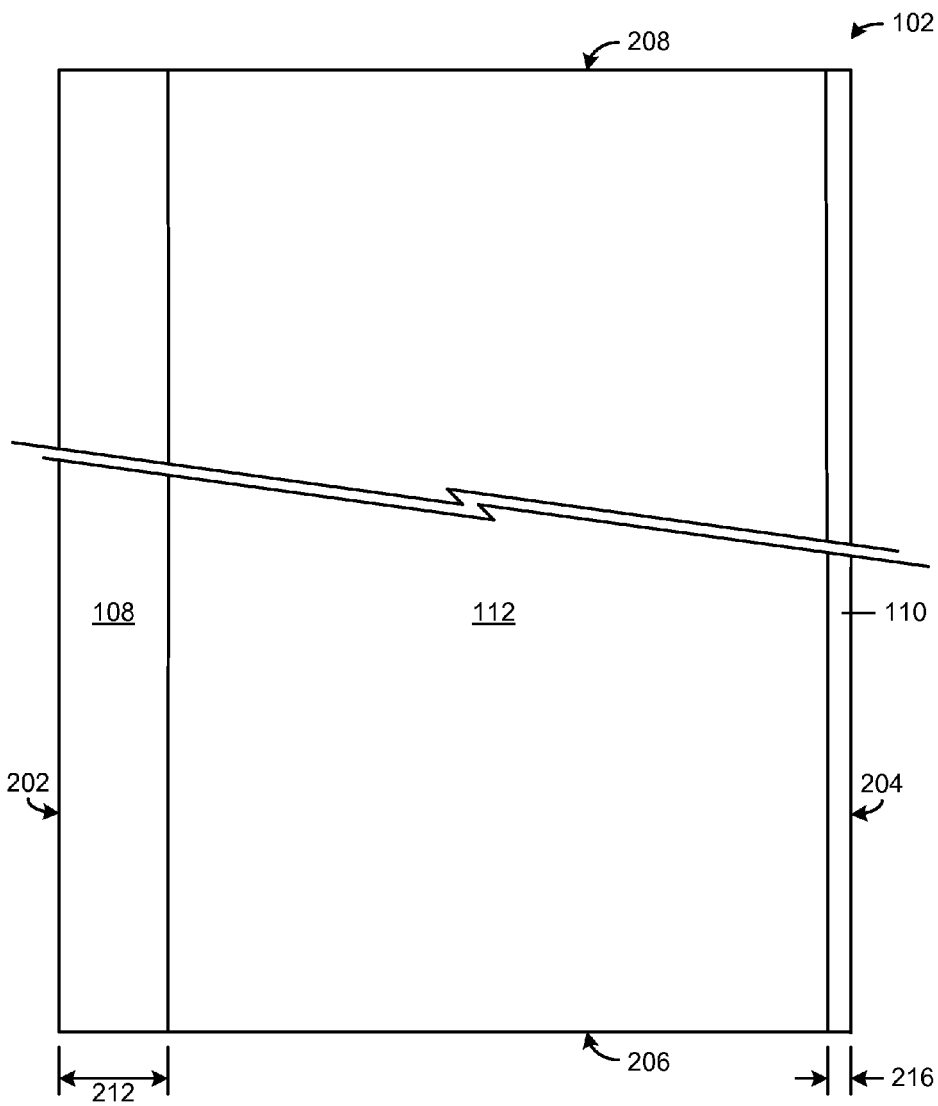
FIGS. 2A and 2B are front and cross-sectional views, respectively, of an extruded fire resistant material in accordance with one embodiment of the present invention.
Figure 2B:
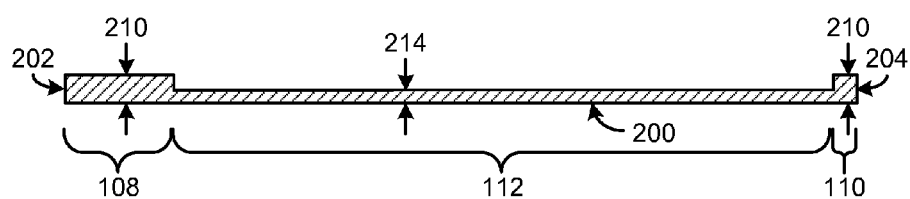

Referring now to FIGS. 2A and 2B, front and cross-sectional views, respectively, of an extruded fire resistant material 102 in accordance with one embodiment of the present invention are shown. The extruded fire resistant material 102 has a bottom 200, a first side 202, a second side 204, a first end 206 and a second end 208 to form a first raised portion 108, a second raised portion 110 and a lower portion 112 disposed between the first raised portion 108 and the second raised portion 110. The first raised portion 108, the second raised portion 110 and the lower portion 112 extend from the first end 206 to the second end 208. The first raised portion 108 has a first thickness 210 above the bottom 200 and a first width 212 that extends from the first side 202 to the lower portion 112. The lower portion 112 has a second thickness 214 above the bottom 200. The second raised portion 110 has the first thickness 202 above the bottom 200 and a second width 216 that extends from the second side 204 to the lower portion 112. The first width 212 of the first raised portion 108 is sufficient to accommodate a lockset. The second width 216 of the second raised portion 110 is sufficient to accommodate a set of door hinges. Note that the extruded fire resistant material 102 may be formed by other non-extrusion manufacturing processes.

Figure 3:
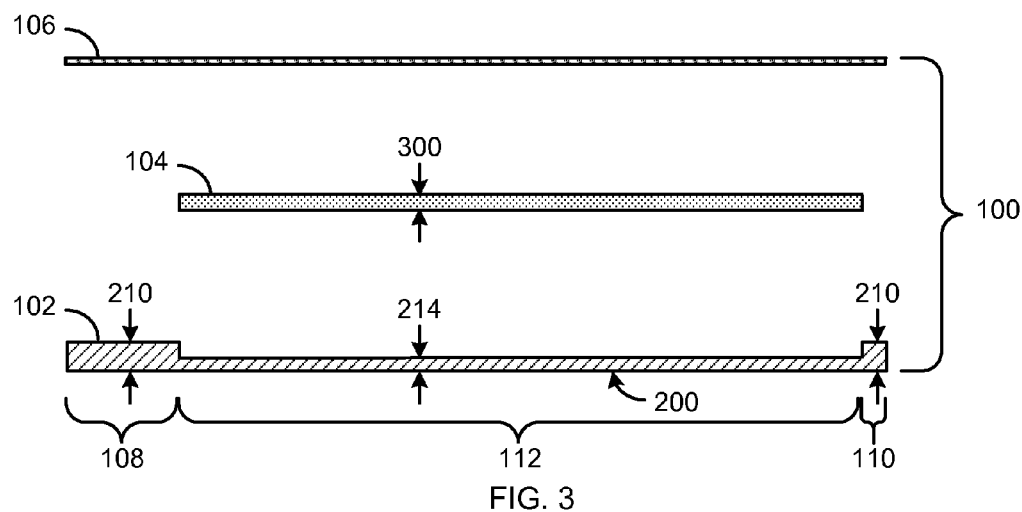
FIG. 3 is an exploded cross-sectional view of a core for a fire rated door in accordance with one embodiment of the present invention.
Figure 4:
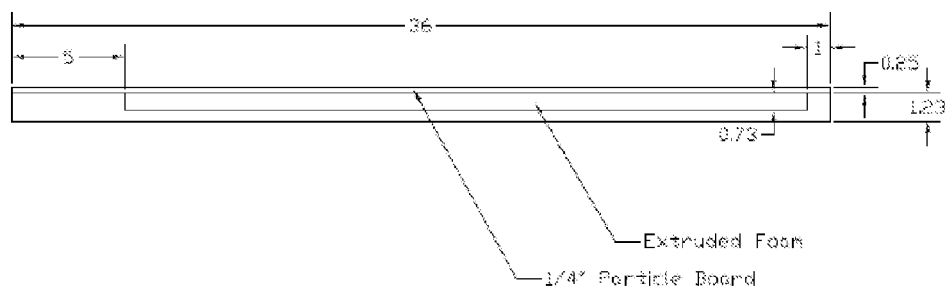
FIG. 4 is a side view of a core for a fire rated door showing dimensions in accordance with an example of one embodiment of the present invention.

Now referring to FIG. 3, an exploded cross-sectional view of a core 100 for a fire rated door in accordance with one embodiment of the present invention is shown. The extruded fire resistant material 102 is described above in reference to FIG. 2. The filler material 104 has a third thickness 300 disposed above the lower portion 112 of the extruded fire resistant material 102 between the first raised portion 108 and the second portion 110 such that the sum of the second thickness 214 and the third thickness 300 is substantially equal to the first thickness 210. The filler material can be Styrene, a spray foam, an extruded foam or one or more protective layers. The one or more protective layers can be a fire resistant material, a blast resistant material, a ballistic resistant material, a shielding material, a chemical resistant material, a biohazard resistant material, a radiation resistant material, a dampening material, a grounding material or a combination thereof. The one or more protective layers can also be one or more gypsum boards, one or more metallic sheets, one or more lead sheets, one or more Kevlar sheets, one or more ceramic sheets, a layer of urethane foam, a layer of graphite, a wire mesh or a combination thereof. The panel 106 is attached to the first raised portion 108 and the second raised portion 110 of the extruded fire resistant material 102 and covers the filler material 104. The panel can be a lignocellulosic substrate, a wood, a wood composite, a medium density fiberboard, a particleboard, a Masonite, a fiberglass, a metal, a plastic or other suitable material. In addition, the extruded fire resistant material 102 and panel 106 (or the completed core 100) can be coated with an intumescent or fire resistant material. FIG. 4 shows a side view of a core 100 for a fire rated door showing dimensions in accordance with an example of one embodiment of the present invention.

Figure 5:
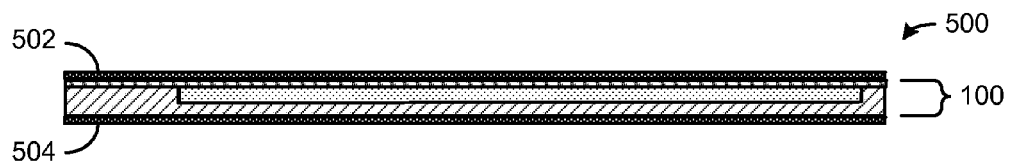
FIG. 5 is a cross-sectional view of a fire rated door using a core in accordance with another embodiment of the present invention.
Figure 6:
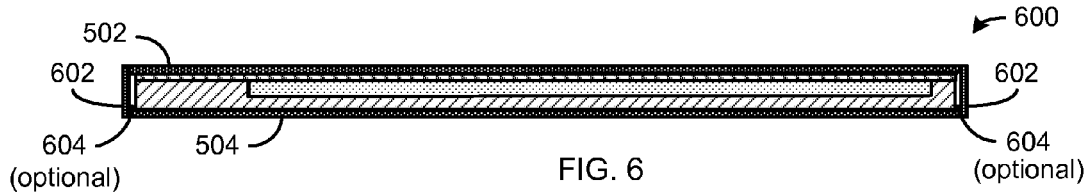
FIG. 6 is a cross-sectional view of a fire rated door using a core in accordance with yet another embodiment of the present invention.

Referring now to FIGS. 5 and 6, cross-sectional views of a fire rated door 500 and 600 using a core 100 in accordance with another embodiment of the present invention are shown. The fire rated door 500 includes a core 100, a first decorative panel 502 and a second decorative panel 504. The first decorative panel 502 is attached to the panel 106 of the core 100. The second decorative panel 504 is attached to the bottom 200 of the extruded fire resistant material 102. The core 100 was previously described above in reference to FIGS. 1-4. The first and second decorative panels 502 and 504 can be wood, veneer, fiberglass, metal, plastic, composite material or other suitable substance. The fire rated door 600 is the same as described with respect to FIG. 5 except that an exterior banding 602 is attached to each side (202, 204) and end (206, 208) of the core 100. Note that an intumescent banding material 604 (optional) can be disposed between the exterior banding 602 and the core 100.

Figure 7:
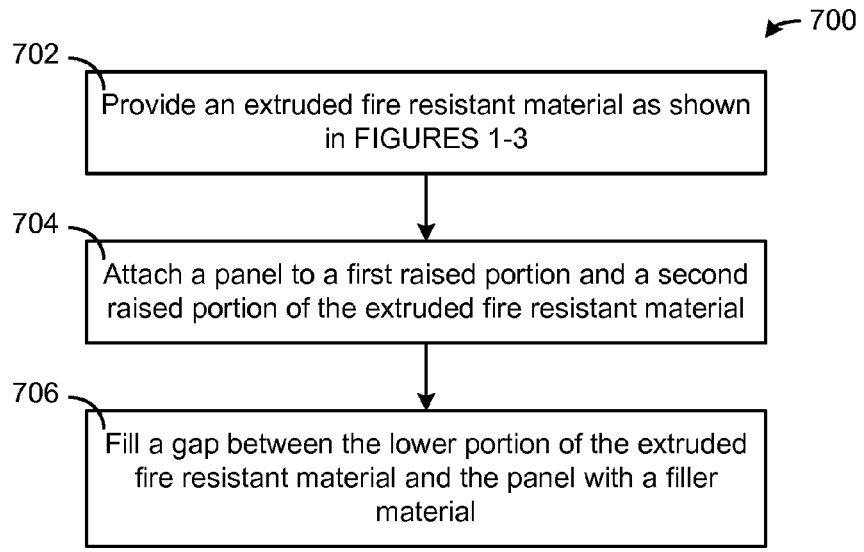
FIG. 7 is a flow chart of a method of manufacturing a core for a fire rated door in accordance with another embodiment of the present invention.

Now referring to FIG. 7, a flow chart of a method 700 of manufacturing a core 100 for a fire rated door in accordance with another embodiment of the present invention is shown. An extruded fire resistant material 102 is provided in block 702. The extruded fire resistant material 102 was previously described above in reference to FIGS. 1-3. A panel 106 is attached to the first raised portion and the second raised portion of the extruded fire resistant material in block 704, such that a gap between the panel and the lower portion of the extruded fire resistant material has a third thickness and the sum of the second thickness and the third thickness is substantially equal to the first thickness. The gap is then filled with a filler material in block 706. The filler material 104 and panel 106 were previously described above in reference to FIGS. 1 and 3. Note that method 700 can be performed as part of a continuous manufacturing process.

Figure 8:
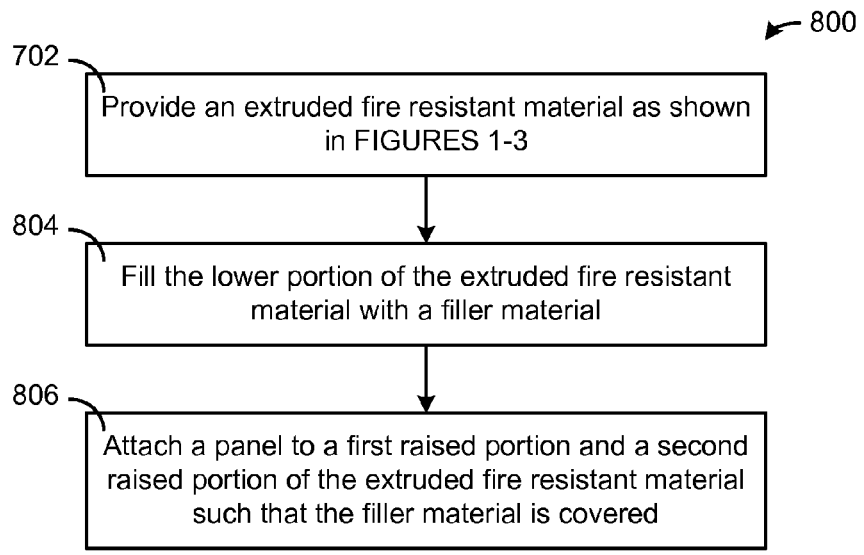
FIG. 8 is a flow chart of a method of manufacturing a core for a fire rated door in accordance with yet another embodiment of the present invention.

Referring now to FIG. 8, a flow chart of a method 800 of manufacturing a core 100 for a fire rated door in accordance with yet another embodiment of the present invention is shown. An extruded fire resistant material 102 is provided in block 702. The extruded fire resistant material 102 was previously described above in reference to FIGS. 1-3. The lower portion of the extruded fire resistant material 102 between the first raised portion and the second portion is filled with a filler material 104 to a third thickness in block 804 such that the sum of the second thickness and the third thickness is substantially equal to the first thickness. A panel 106 is attached to the first raised portion and the second raised portion of the extruded fire resistant material and covers the filler material in block 806. The filler material 104 and panel 106 were previously described above in reference to FIGS. 1 and 3. Note that method 800 can be performed as part of a continuous manufacturing process.

It will be understood by those of skill in the art that steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A core for a fire rated door comprising:
   an extruded fire resistant material having a bottom, a first side, a second side, a first end and a second end to form a first raised portion, a second raised portion and a single lower portion disposed between the first raised portion and the second raised portion, wherein: (a) the first raised portion, the second raised portion and the single lower portion extend from the first end to the second end, (b) the first raised portion has a first thickness above the bottom and a first width that extends from the first side to the single lower portion, (c) the single lower portion has a second thickness above the bottom, (d) the second raised portion has the first thickness above the bottom and a second width that extends from the second side to the single lower portion, (e) the first width of the first raised portion is sufficient to accommodate a lockset, and (f) the second width of the second raised portion is sufficient to accommodate a set of door hinges;
   a filler material having a third thickness disposed above the single lower portion of the extruded fire resistant material between the first raised portion and the second raised portion such that the sum of the second thickness and the third thickness is substantially equal to the first thickness; and
   a single substantially flat panel attached to the first raised portion and the second raised portion of the extruded fire resistant material and covering the filler material.

2. The core as recited in claim 1, wherein the single substantially flat panel comprises a lignocellulosic substrate, a wood, a wood composite, a medium density fiberboard, a particleboard, a masonite, a fiberglass, a metal, a plastic or a combination thereof.

3. The core as recited in claim 1, wherein the filler material comprises a styrene, a spray foam material, an extruded foam material or a protective layer.

4. The core as recited in claim 3, wherein the filler material comprises a fire resistant material, a blast resistant material, a ballistic resistant material, a shielding material, a chemical resistant material, a biohazard resistant material, a radiation resistant material, a dampening material, a grounding material or a combination thereof.

5. The core as recited in claim 3, wherein the filler material comprises a gypsum board, a metallic sheet, a lead sheet, a kevlar sheet, a ceramic sheet, a layer of urethane foam, a layer of graphite, a wire mesh or a combination thereof.

6. The core as recited in claim 1, wherein the extruded fire resistant material and single substantially flat panel are coated with an intumescent or fire resistant material.

7. A fire rated door comprising:
a core comprising: (1) an extruded fire resistant material having a bottom, a first side, a second side, a first end and a second end to form a first raised portion, a second raised portion and a single lower portion disposed between the first raised portion and the second raised portion, wherein: (a) the first raised portion, the second raised portion and the single lower portion extend from the first end to the second end, (b) the first raised portion has a first thickness above the bottom and a first width that extends from the first side to the single lower portion, (c) the single lower portion has a second thickness above the bottom, (d) the second raised portion has the first thickness above the bottom and a second width that extends from the second side to the single lower portion, (e) the first width of the first raised portion is sufficient to accommodate a lockset, and (f) the second width of the second raised portion is sufficient to accommodate a set of door hinges, (2) a filler material having a third thickness disposed above the single lower portion of the extruded fire resistant material between the first raised portion and the second portion such that the sum of the second thickness and the third thickness is substantially equal to the first thickness, and (3) a single substantially flat panel attached to the first raised portion and the second raised portion of the extruded fire resistant material and covering the filler material;
a first decorative panel attached to the single substantially flat panel of the core, the first decorative panel extending at least to the first side, the second side, the first end and the second end of the core; and
a second decorative panel attached to the bottom of the extruded fire resistant material, the second decorative panel extending at least to the first side, the second side, the first end and the second end of the core.

8. The fire rated door as recited in claim 7, further comprising an exterior banding attached to each side and end of the core.

9. The fire rated door as recited in claim 8, further comprising an intumescent banding material disposed between the exterior banding and the core.

10. The fire rated door as recited in claim 7, wherein the single substantially flat panel comprises a lignocellulosic substrate, a wood, a wood composite, a medium density fiberboard, a particleboard, a masonite, a fiberglass, a metal, a plastic or a combination thereof or a combination thereof.

11. The fire rated door as recited in claim 7, wherein the filler material comprises a styrene, a spray foam, an extruded foam or a protective layer.

12. The fire rated door as recited in claim 11, wherein the filler material comprises a fire resistant material, a blast resistant material, a ballistic resistant material, a shielding material, a chemical resistant material, a biohazard resistant material, a radiation resistant material, a dampening material, a grounding material or a combination thereof.

13. The fire rated door as recited in claim 11, wherein the filler material comprises a gypsum board, a metallic sheet, a lead sheet, a kevlar sheet, a ceramic sheet, a layer of urethane foam, a layer of graphite, a wire mesh or a combination thereof.

14. The fire rated door as recited in claim 7, wherein the extruded fire resistant material and single substantially flat panel are coated with an intumescent or fire resistant material.

* * * * *